(12) United States Patent
Kuzumaki et al.

(10) Patent No.: US 7,872,888 B2
(45) Date of Patent: *Jan. 18, 2011

(54) ELECTRIC POWER CONVERSION SYSTEM (75) Inventors: Atsuhiko Kuzumaki, Fuchu (JP); Hiroshi Mochikawa, Hachioji (JP); Tateo Koyama, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 12/282,997

(22) PCT Filed: Feb. 16, 2007

(86) PCT No.: PCT/JP2007/052821

§ 371 (c)(1),
(2), (4) Date: Sep. 15, 2008

(87) PCT Pub. No.: WO2007/108263

PCT Pub. Date: Sep. 27, 2007

(65) Prior Publication Data

US 2009/0135636 A1 May 28, 2009

(30) Foreign Application Priority Data

Mar. 15, 2006 (JP) .............................. 2006-070239

(51) Int. Cl.
*H02M 3/24* (2006.01)
*H02M 7/5387* (2007.01)

(52) U.S. Cl. ......................................... 363/98; 363/132

(58) Field of Classification Search ................... 363/95, 363/98, 31, 132, 133, 134
See application file for complete search history.

(56) References Cited

U.S. PATENT DOCUMENTS 4,675,544 A    6/1987   Schrenk (Continued)

FOREIGN PATENT DOCUMENTS

JP          07 194138          7/1995

(Continued)

OTHER PUBLICATIONS

Jens Peter Karst, et al., "Transductor Based High Speed Gate Drive", 2004 35th Annual IEEE Power Electronics Specialists Conference, 2004, pp. 100-104.

(Continued)

*Primary Examiner*—Adolf Berhane
*Assistant Examiner*—Jeffrey Gblende
(74) *Attorney, Agent, or Firm*—Oblon, Spivak, McClelland, Maier & Neustadt, L.L.P.

(57) ABSTRACT

An electric power conversion system includes a DC power supply, plural main circuit switching devices bridge-connected to carry out DC/AC convert, having freewheeling diodes connected in reverse parallel thereto, respectively, and a reverse voltage application circuit for applying a reverse voltage smaller than the DC power supply to each freewheeling diode, upon a cutoff of back-flow current of the freewheeling diode, the reverse voltage application circuit being composed of a series connection of a low-voltage DC power supply, a reverse voltage application switching device having a lower withstand voltage than the main circuit switching devices and adapted to turn on upon a reverse recovery of the freewheeling diode, and an auxiliary diode having a shorter reverse recovery time than the freewheeling diode, the reverse voltage application switch being a device having holes as a majority carrier.

25 Claims, 6 Drawing Sheets

U.S. PATENT DOCUMENTS

| | | | |
|---|---|---|---|
| 6,058,037 A * | 5/2000 | Shibata et al. | 363/132 |
| 6,275,399 B1 * | 8/2001 | Miyazaki et al. | 363/98 |
| 6,434,019 B2 * | 8/2002 | Baudelot et al. | 363/16 |
| 6,829,152 B2 * | 12/2004 | Miura et al. | 363/40 |
| 7,570,502 B2 * | 8/2009 | Sugawara et al. | 363/132 |
| 2003/0030424 A1 * | 2/2003 | Hinterscher et al. | 323/313 |
| 2003/0107905 A1 | 6/2003 | Miura et al. | |

FOREIGN PATENT DOCUMENTS

| | | |
|---|---|---|
| JP | 07194138 A * | 7/1995 |
| JP | 10 327585 | 12/1998 |
| JP | 2001 251846 | 9/2001 |
| JP | 2003 235240 | 8/2003 |
| JP | 2006 141167 | 6/2006 |
| JP | 2006 141168 | 6/2006 |
| JP | 2007 082303 | 3/2007 |
| WO | 2006 052032 | 5/2006 |

OTHER PUBLICATIONS

Office Action issued Aug. 19, 2010, in Korean Patent Application No. 10-2008-7023161(with English language translation).

\* cited by examiner

ELECTRIC POWER CONVERSION SYSTEM

TECHNICAL FIELD

The present invention relates to an electric power conversion system, and in particular, to an electric power conversion system adapted for reduction of a loss at a free wheeling diode.

BACKGROUND ART

A typical inverter converts direct current from a direct current supply to alternating current by an inverter circuit with bridge-connected switching devices, to have alternating current outputs. For this, the load does not always have a power factor of 1, and a free wheeling diode is connected in reverse parallel to a respective switching device. In this configuration, as the switching device turns off, stored energy in the load flows back through the free wheeling diode.

For a free wheeling diode conducting a forward current, if a switching device turns on in an arm with an opposite polarity to the free wheeling diode, a direct current voltage is applied as a reverse bias across the free wheeling diode. The free wheeling diode cuts off after a reverse current caused by residual charges flows therethrough. Hence much loss is caused at the free wheeling diode by the reverse current and direct current voltage, with a worsened efficiency of the inverter. Further, for this reason, there has been a need for an enlarged scale of cooler for the system.

For that, there has been a method disclosed in Japanese Patent Application Laid-Open Publication No. 10-327,585, on pages 3 to 5 and in FIG. 1, in which an inverter is provided with a reverse voltage application circuit, and upon a cutoff of a free wheeling diode, a small reverse voltage is applied from the reverse voltage application circuit to the freewheeling diode, so that a reverse recovery of the free wheeling diode is induced by a low-voltage direct current supply of the reverse voltage application circuit, so as to reduce the loss being caused at the free wheeling diode.

According to the above-noted preceding technique, the reverse voltage application circuit has a reverse voltage applying switching device, and upon a reverse recovery of the free wheeling diode, the reverse voltage applying switching device is turned on for application of a voltage of low-voltage direct current, thus permitting the free wheeling diode to be reverse recovered with a reduced loss.

However, in the preceding technique, the reverse voltage application circuit has an auxiliary power supply composed of capacitors and diodes, and drives switching devices for reverse voltage application by using the auxiliary power supply, so the configuration of the reverse voltage application circuit is complicated, causing also the volume of the reverse voltage application circuit to be enlarged, as a significant issue. Further, for capacitors to be charged, currents are conducted through diodes, not simply causing heat to dissipate as losses by those currents at the diodes, but also having the capacitors charged with voltages reduced lower than voltages of low-voltage direct currents by fractions of the losses at the diodes, as an issue.

DISCLOSURE OF INVENTION

The present invention has been devised in view of such the problems of the preceding technique, and it is an object thereof to provide an electric power conversion system that allows for a reduced reverse recovery loss of a free wheeling diode by a reverse voltage application circuit with a simplified circuit configuration and with low loss.

According to the present invention, to achieve the above-noted object, an electric power conversion system is characterized by a direct current power supply, a plurality of main circuit switching devices bridge-connected to convert direct current of the direct current power supply to alternating current, each respectively having a free wheeling diode connected in reverse parallel thereto, and a reverse voltage applying means for applying a reverse voltage smaller than the direct current power supply to the free wheeling diode, upon a cutoff of back-flow current of the free wheeling diode, the reverse voltage applying means comprising a series connection of a low-voltage direct current power supply having a voltage lower than a voltage of the direct current power supply, a reverse voltage application switching device having a lower withstand voltage than the main circuit switching device and adapted to turn on upon a reverse recovery of the free wheeling diode, and an auxiliary diode having a shorter reverse recovery time than the free wheeling diode, the reverse voltage application switching device being a device having holes as the majority carrier.

Further, according to the present invention, an electric power conversion system is characterized by a direct current power supply, a plurality of main circuit switching devices bridge-connected to convert direct current of the direct current power supply to alternating current, having free wheeling diodes connected in reverse parallel thereto, respectively, normally on switching devices each respectively connected in series to, among the main circuit switching devices, a main circuit switching device in a negative arm, and connected, for turn-ons and turn-offs in synchronism with turn-ons and turn-offs of the main circuit switching device in the negative arm, at a gate thereof with a negative electrode of the main circuit switching device, and a reverse voltage applying means for applying, upon a cutoff of back-flow current of, among the free wheeling diodes, a free wheeling diode in the negative arm, a reverse voltage smaller than the direct current power supply to the free wheeling diode, the reverse voltage applying means comprising a series connection of a low-voltage direct current power supply having a voltage lower than a voltage of the direct current power supply, a reverse voltage application switching device having a lower withstand voltage than the main circuit switching device and adapted to turn on upon a reverse recovery of the free wheeling diode, and an auxiliary diode having a shorter reverse recovery time than the free wheeling diode, the reverse voltage application switching device being a device having holes as the majority carrier.

According to the present invention, it is enabled to provide an electric power conversion system allowing for a reduced reverse recovery loss of a free wheeling diode by a reverse voltage application circuit with a simplified circuit configuration and with low loss.

BEST MODE FOR CARRYING OUT THE INVENTION

There will be detailed embodiments of the present invention with reference to the drawings.

First Embodiment

Figure 1:
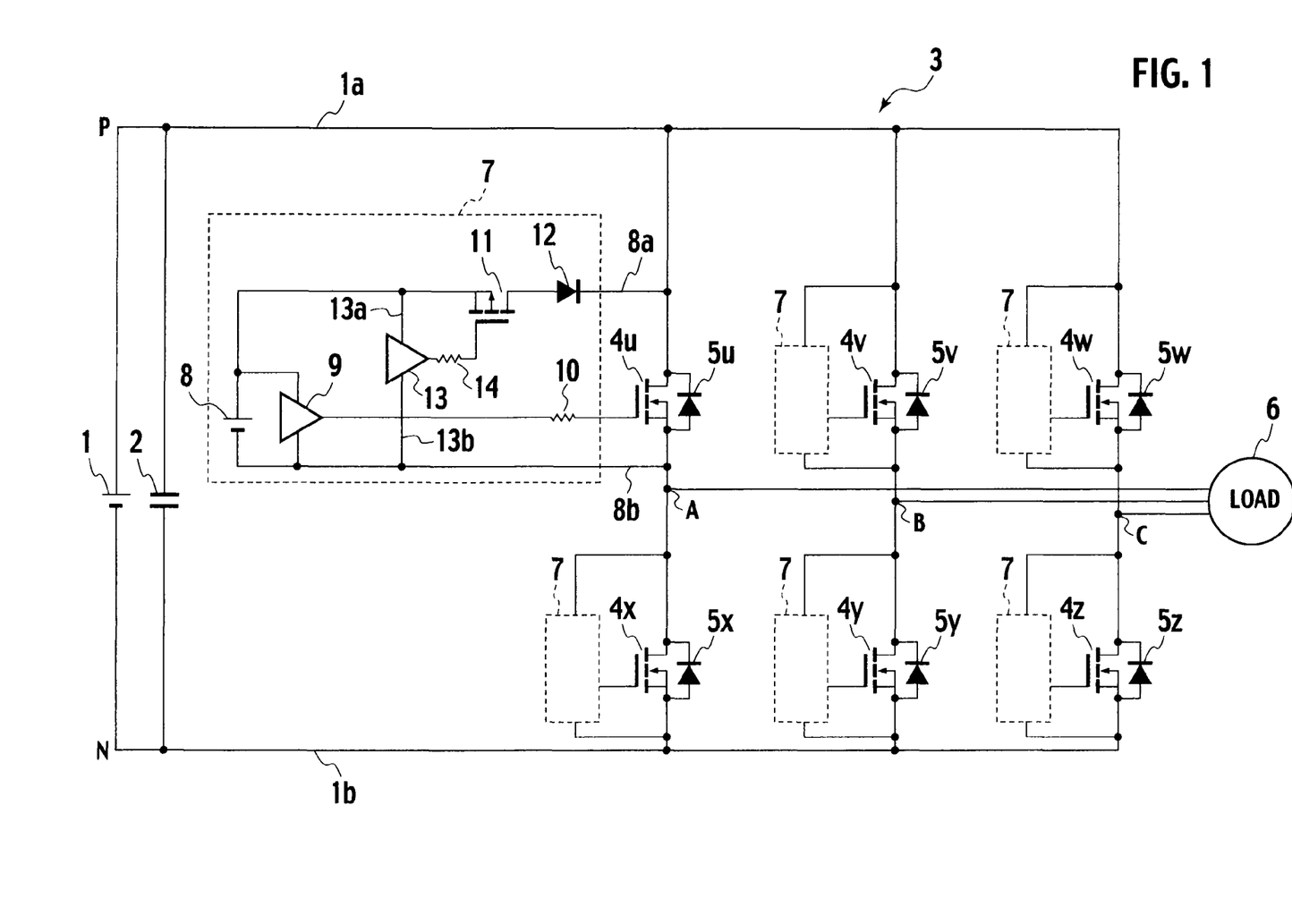
FIG. 1 is a circuit configuration diagram of an electric power conversion system according to a first embodiment of the present invention.

FIG. 1 is a circuit configuration diagram of an electric power conversion system according to the first embodiment of the present invention. In FIG. 1, a direct current voltage source 1 is implemented as a rectified three-phase alternating current power supply, for example; and as well as a smoothing capacitor 2, an inverter main circuit 3 is connected between a positive direct current bus 1a and a negative direct current bus 1b of the direct current voltage source 1. The inverter main circuit 3 is configured in the form of three-phase bridge connections of main circuit switching devices 4u, 4v, and 4w corresponding to main circuit switching devices of positive arms and main circuit switching devices 4x, 4y, and 4z of negative arms. Those main circuit switching devices 4u, 4v, 4w, 4x, 4y, and 4z have free wheeling diodes 5u, 5v, 5w, 5x, 5y, and 5z reverse parallel connected between positive electrodes and negative electrodes thereof, respectively. Further, the inverter main circuit 3 has outputs at points A, B, and C connected to a load 6, such as an alternating current motor, for example. It is noted that the free wheeling diodes 5u, 5v, 5w, 5x, 5y, and 5z may be incorporated in the main circuit switching devices 4u, 4v, 4w, 4x, 4y, and 4z, respectively.

Each of the free wheeling diodes 5u, 5v, 5w, 5x, 5y, and 5z has a reverse voltage application circuit 7 connected in parallel thereto. The reverse voltage application circuit 7 has a low-voltage direct current power supply 8 lower in voltage value than the direct current voltage source 1, and the low-voltage direct current power supply 8 has power supply lines 8a and 8b thereof connected between a positive electrode and a negative electrode of a respective one of the main circuit switching devices 4u, 4v, 4w, 4x, 4y, and 4z. For the free wheeling diode 5u of a phase u, configuration of the reverse voltage application circuit 7 will be described. For free wheeling diodes of other phases else than the phase u, it is noted that their reverse voltage application circuits 7 are basically identical to the reverse voltage application circuit 7 for the free wheeling diode 5u of the phase u, and description thereof is omitted.

The reverse voltage application circuit 7 has a gate drive circuit 9, and the gate drive circuit 9 is electrically connected in parallel with the low-voltage direct current power supply 8, and has an output thereof connected through a gate resistor 10 to a gate of the main circuit switching device 4u. And, with a drive signal output to the gate drive circuit 9 from an unshown switching timing generating circuit, the gate drive circuit 9 is driven by a voltage from the low-voltage direct current power supply 8, to turn on the main circuit switching device 4u.

The reverse voltage application circuit 7 has a reverse voltage application switching device 11 inserted in series to the power supply line 8a of the low-voltage direct current power supply 8. The reverse voltage application switching device 11 is connected between from a positive electrode of the low-voltage direct current power supply 8 through an auxiliary diode 12 to a cathode of the free wheeling diode 5u. The reverse voltage application switching device 11 is selected to have a withstand voltage lower than a withstand voltage of the main circuit switching device 4u. The reverse voltage application switching device 11 is operative to turn on upon a reverse recovery of the free wheeling diode 5u. Here, this reverse voltage application switching device needs no more than being a switching device having holes as the majority carrier, and although a p-channel MOSFET is used, it also is possible to apply e.g. a pnp transistor, without restriction to the p-channel MOSFET.

From an unshown potential decision circuit adapted for a drive signal output depending on a potential at the point A of the inverter main circuit 3, a drive signal is output to a gate drive circuit 13, when the gate drive circuit 13 operates to turn on the reverse voltage application switching device 11 through a gate resistor 14. By that, a reverse voltage lower in voltage value than the direct current voltage source 1 is applied from the low-voltage direct current power supply 8 through the reverse voltage application switching device 11 and the auxiliary diode 12 to the free wheeling diode 5u. A reverse current is thereby supplied through the power supply line 8a to the free wheeling diode 5u, so a reduced main circuit current is conducted through the free wheeling diode 5u. That is, a reverse recovery is caused by application of a voltage of the low-voltage direct current power supply 8 of the reverse voltage application circuit 7. It is noted that, in FIG. 1, the gate drive circuit 13 is connected through power supply lines 13a and 13b to the power supply lines 8a and 8b of the low-voltage direct current power supply 8.

As a reduced main circuit current is conducted through the free wheeling diode 5u, such a main circuit current that would have been conducted from the load 6 through the free wheeling diode 5u to the positive direct current bus 1a of the direct current voltage source 1 inflows to the reverse voltage application circuit 7. A main circuit current flowing into the reverse voltage application circuit 7 passes through the power supply line 8b of the low-voltage direct current power supply 8, and inflows to the low-voltage direct current power supply 8. It is then conducted via the reverse voltage application switching device 11 and the auxiliary diode 12 to the positive direct current bus 1a of the direct current voltage source 1.

After that, at a phase x having a reverse polarity to the phase u, as the main circuit switching device 4x turns on, such a main circuit current that would have been conducted through the reverse voltage application circuit 7 flows to the main circuit switching device 4x. As a main circuit current is conducted through the main circuit switching device 4x, a reverse voltage is applied to the auxiliary diode 12, and the auxiliary diode 12 gets reverse recovered and thereafter turns off, so such a main circuit current that would have been conducted through the reverse voltage application circuit 7 is kept from flowing. Here, for the auxiliary diode 12, there is selected a high-speed diode having a shorter reverse recovery time than the free wheeling diode 5u, so the auxiliary diode 12 has a small reverse recovery loss.

For other phases else than the phase u, it is noted that their reverse voltage application actions are basically alike to the phase u, and description thereof is omitted.

In the electric power conversion system thus configured according to the first embodiment, a p-channel MOSFET having holes as the majority carrier is used as the reverse voltage application switching device 11, so the gate drive circuit 13 for driving the reverse voltage application switching device 11 is allowed to get a drive power supply therefor directly from the low-voltage direct current power supply 8. It therefore is unnecessary to have a gate driving auxiliary diode, allowing for a simplified reverse voltage application circuit 7.

Although the inverter main circuit 3 has been described as a three-phase output inverter of two levels in the foregoing description, it may well be a multi-level inverter of three levels or more, and the output phase may be a single phase or multi-phased.

Second Embodiment

Figure 2:
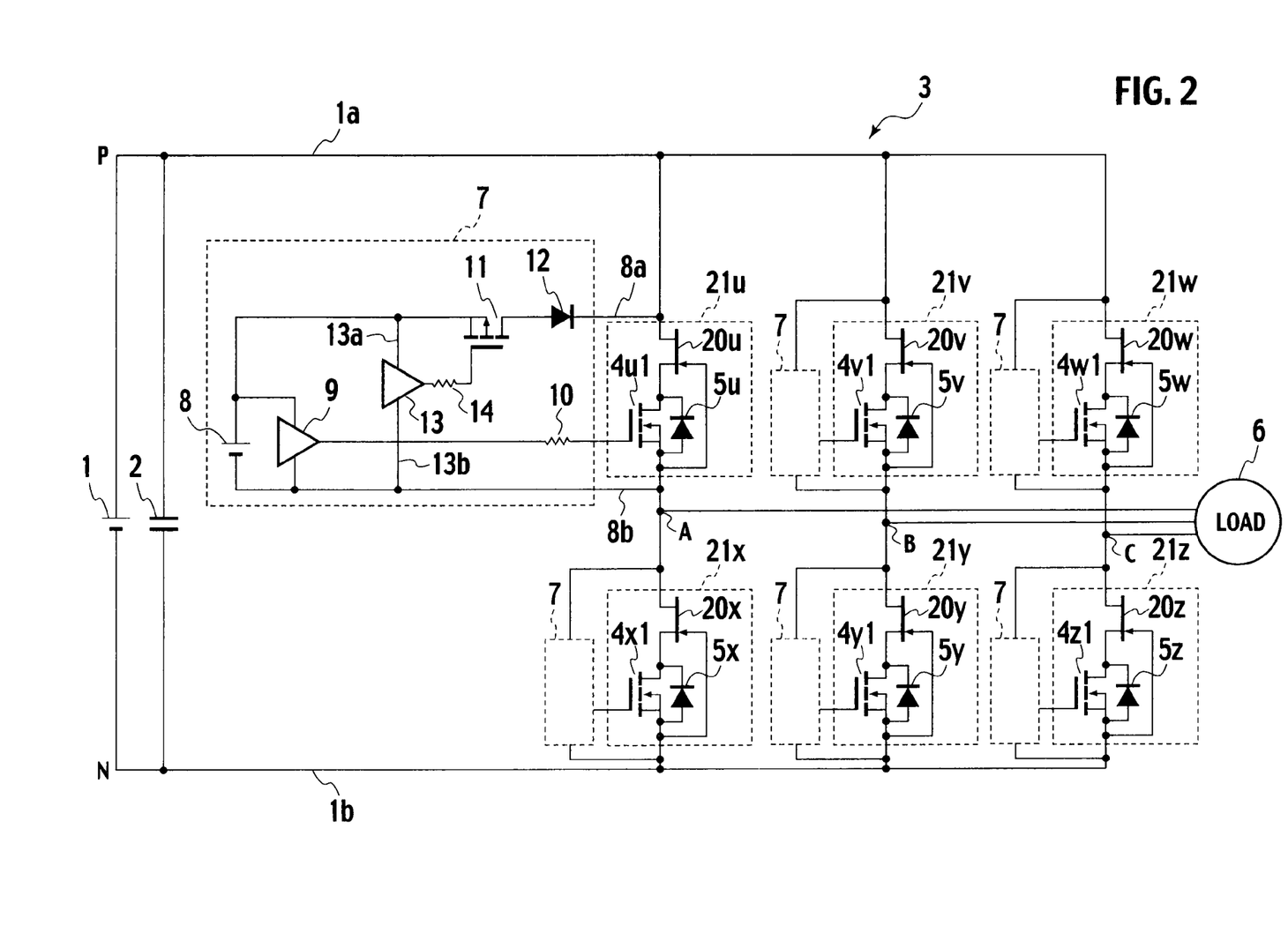
FIG. 2 is a circuit configuration diagram of an electric power conversion system according to a second embodiment of the present invention.

FIG. 2 is a circuit configuration diagram of an electric power conversion system according to the second embodiment of the present invention. As of parts of this embodiment, like parts to parts of the circuit configuration diagram of the electric power conversion system according to the first embodiment shown in FIG. 1 are designated by like reference characters, and description thereof is omitted. The present embodiment is different from the first embodiment in that it is configured such that main circuit switching devices $4u1$, $4v1$, $4w1$, $4x1$, $4y1$, and $4z1$ are low withstand-voltage devices, and those devices have at positive electrode ends thereof normally on switching devices $20u$, $20v$, $20w$, $20x$, $20y$, and $20z$ inserted in series to those devices, respectively, the normally on switching devices $20u$, $20v$, $20w$, $20x$, $20y$, and $20z$ having gates thereof connected to negative electrodes of the main circuit switching devices $4u$, $4v$, $4w$, $4x$, $4y$, and $4z$, respectively.

In a main circuit 3 thus configured, for a positive arm at a phase u, for example, the normally on switching device $20u$ is selected to a high withstand voltage, and the main circuit switching device $4u1$ is selected to a low withstand voltage, to have a complex main circuit device made up by the normally on switching device $20u$, the main circuit switching device $4u1$, and a free wheeling diode $5u$. This complex main circuit device is referred to as a cascode device $21u$.

As the normally on switching device, among others, e.g. a junction-gate field effect transistor JFET or static induction transistor SIT may be used. The normally on switching device can serve for main circuit current conduction in both forward and reverse directions. Generally, the normally on switching device has a lower resistance than normally off switching devices, e.g. MOSFETs, and a small loss. It is noted that, as illustrated in the figure, the normally on switching device has a gate terminal thereof connected, for use, to e.g. a source terminal of a MOSFET being a main circuit switching device with a low withstand voltage.

The normally on switching device $20u$ turns off with a negative voltage applied between a gate terminal and a source terminal thereof, as it is sufficient for a turn-off of normally on switching device, and turns on with a voltage getting a voltage of zero or more between the gate terminal and the source terminal. The gate terminal of the normally on switching device $20u$ is connected to a source terminal of the main circuit switching device $4u1$, and the source terminal of the normally on switching device $20u$ is connected to a drain terminal of the main circuit switching device $4u1$. Therefore, with the main circuit switching device $4u1$ in an off state, a negative voltage is applied between the gate terminal and the source terminal of the normally on switching device $20u$, and the normally on switching device $20u$ also has an off state. Further, with the main circuit switching device $4u1$ in an on state, there appears a voltage of substantially zero between the gate terminal and the source terminal of the normally on switching device $20u$ have, and the normally on switching device $20u$ also has an on state. That is, for the cascode device $21u$, by turning the main circuit switching device $4u1$ on and off, the cascode device $21u$ can also be turned on and off in synchronism therewith. Further, the cascode device $21u$ is operable as a normally off type.

In FIG. 2, with a detected voltage at a point A of the inverter main circuit 3, if it is determined that a condition is met for a reverse recovery of the free wheeling diode $5u$ in the cascode device $21u$, then a drive signal is output to a gate drive circuit 13, so that a reverse voltage application switching device 11 is turned on. By this, a small reverse voltage is applied from a low-voltage direct current power supply 8 to the normally on switching device $20u$ and the free wheeling diode $5u$, whereby a reverse current is supplied to the free wheeling diode $5u$ through a power supply line $8a$ and the normally on switching device $20u$, and the free wheeling diode $5u$ has a reduced main circuit current conducted therethrough. That is, a reverse recovery is caused by application of a voltage of the low-voltage direct current power supply 8 of a reverse voltage application circuit 7.

As a reduced main circuit current is conducted through the free wheeling diode $5u$, such a main circuit current that would have been conducted from a load 6 through the free wheeling diode $5u$ and the normally on switching device $20u$ to a positive direct current bus $1a$ of a direct current voltage source 1 inflows to the reverse voltage application circuit 7. A main circuit current flowing into the reverse voltage application circuit 7 passes through a power supply line $8b$ of the low-voltage direct current power supply 8, and inflows to the low-voltage direct current power supply 8. It is then conducted via the reverse voltage application switching device 11 and an auxiliary diode 12 to the positive direct current bus $1a$ of the direct current voltage source 1.

During this period, a reverse recovery of the free wheeling diode $5u$ is completed, so the free wheeling diode $5u$ conducts no main circuit currents.

After that, at a phase x having a reverse polarity to the phase u, as its cascode device $21x$ turns on, such a main circuit current that would have been conducted through the reverse voltage application circuit 7 flows to the cascode device $21x$. As a main circuit current is conducted through the cascode device $21x$, a reverse voltage is applied to the auxiliary diode 12, and the auxiliary diode 12 gets reverse recovered and thereafter turns off, so such a main circuit current that would have been conducted through the reverse voltage application circuit 7 is kept from flowing. Here, for the auxiliary diode 12, there is selected a high-speed diode having a shorter reverse recovery time than the free wheeling diode $5u$, so the auxiliary diode 12 has a small reverse recovery loss.

In the electric power conversion system thus configured according to the second embodiment, a normally on switching device with a high withstand voltage and a low loss is employed as a cascode device in combination with a main circuit switching device with a low withstand voltage, thereby allowing for a still reduced heat dissipation loss.

Third Embodiment

Figure 3:
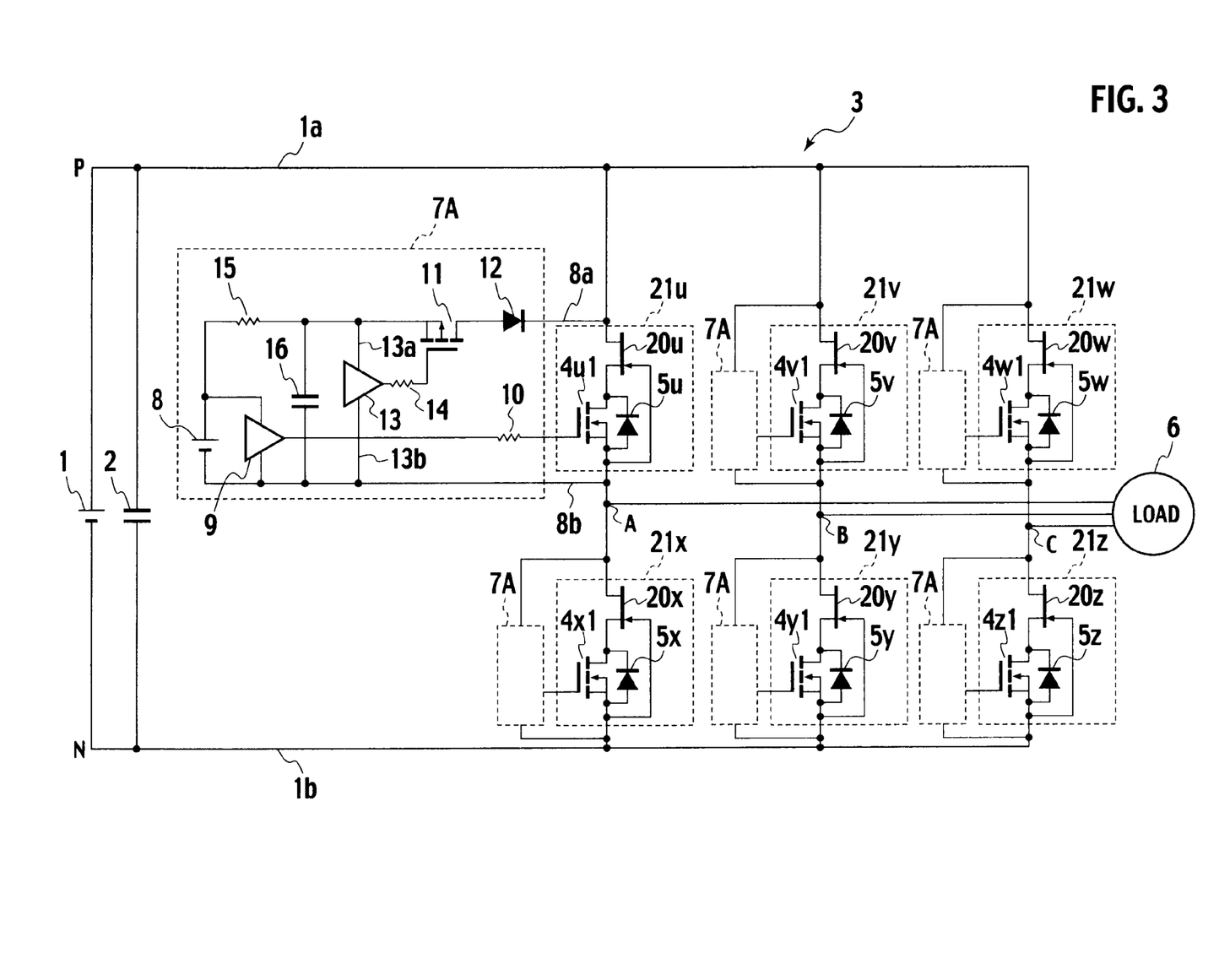
FIG. 3 is a circuit configuration diagram of an electric power conversion system according to a third embodiment of the present invention.

FIG. 3 is a circuit configuration diagram of an electric power conversion system according to the third embodiment of the present invention. As of parts of this embodiment, like parts to parts of the circuit configuration diagram of the electric power conversion system according to the second embodiment shown in FIG. 2 are designated by like reference characters, and description thereof is omitted. The present embodiment is different from the second embodiment in that a current limiting resistor 15 is inserted at a positive electrode end of a low-voltage direct current power supply 8 of a reverse voltage application circuit 7A, and a high-frequency capacitor 16 is provided between the current limiting resistor 15 and a negative electrode of the low-voltage direct current power supply 8.

The low-voltage direct current power supply 8 has a voltage selected to one fourth of a voltage of a direct current voltage source 1, and the high-frequency capacitor 16 should not be any smoothing electrolytic capacitor, but use a high-frequency oriented one, such as a ceramic capacitor, a film capacitor, etc. Further, for the current limiting resistor 15, there may be employed, among others, a wiring resistor of a copper foil pattern of a wiring substrate, or such a wiring resistor as a copper plate, for example.

It is noted that in FIG. 3, there is a discharging route made up by the high-frequency capacitor 16, a reverse voltage application switching device 11, an auxiliary diode 12, a normally on switching device 20u, and a free wheeling diode 5u, which should have as short wirings as possible to minimize circuit inductances, as an important matter. Further, in FIG. 3, the voltage of the low-voltage direct current power supply 8 is available as it is as a power source of a gate drive circuit 9 of a main circuit switching device 4u1 with a low withstand voltage. By this configuration, the reverse voltage application circuit 7A has a simplified configuration.

In this embodiment, the electric power conversion system with the configuration described has high-frequency impedance reduction effects by the current limiting resistor 15 and the high-frequency capacitor 16, whereby impulse-shape currents along with a reverse recovery of the free wheeling diode 5 are kept from flowing through the low-voltage direct current power supply 8, thus allowing the low-voltage direct current power supply 8 to have very small voltage variations even in a reverse recovery of the free wheeling diode 5.

During a period in which a reverse recovery current is supplied to the free wheeling diode 5, a main circuit current (load current) also passes the reverse voltage application circuit 7A, causing a loss by the main circuit current also to be increased. It therefore is desirable to have the free wheeling diode 5 reverse recovered as fast as possible, while this can be achieved according to the present embodiment. Further, burdens on the low-voltage direct current power supply 8 can also be reduced, permitting the low-voltage direct current power supply 8 to do with a small capacity power source, affording a reduced Internal heat dissipation of the low-voltage direct current power supply 8, allowing the reverse voltage application circuit 7A to be small sized.

Fourth Embodiment

Figure 4:
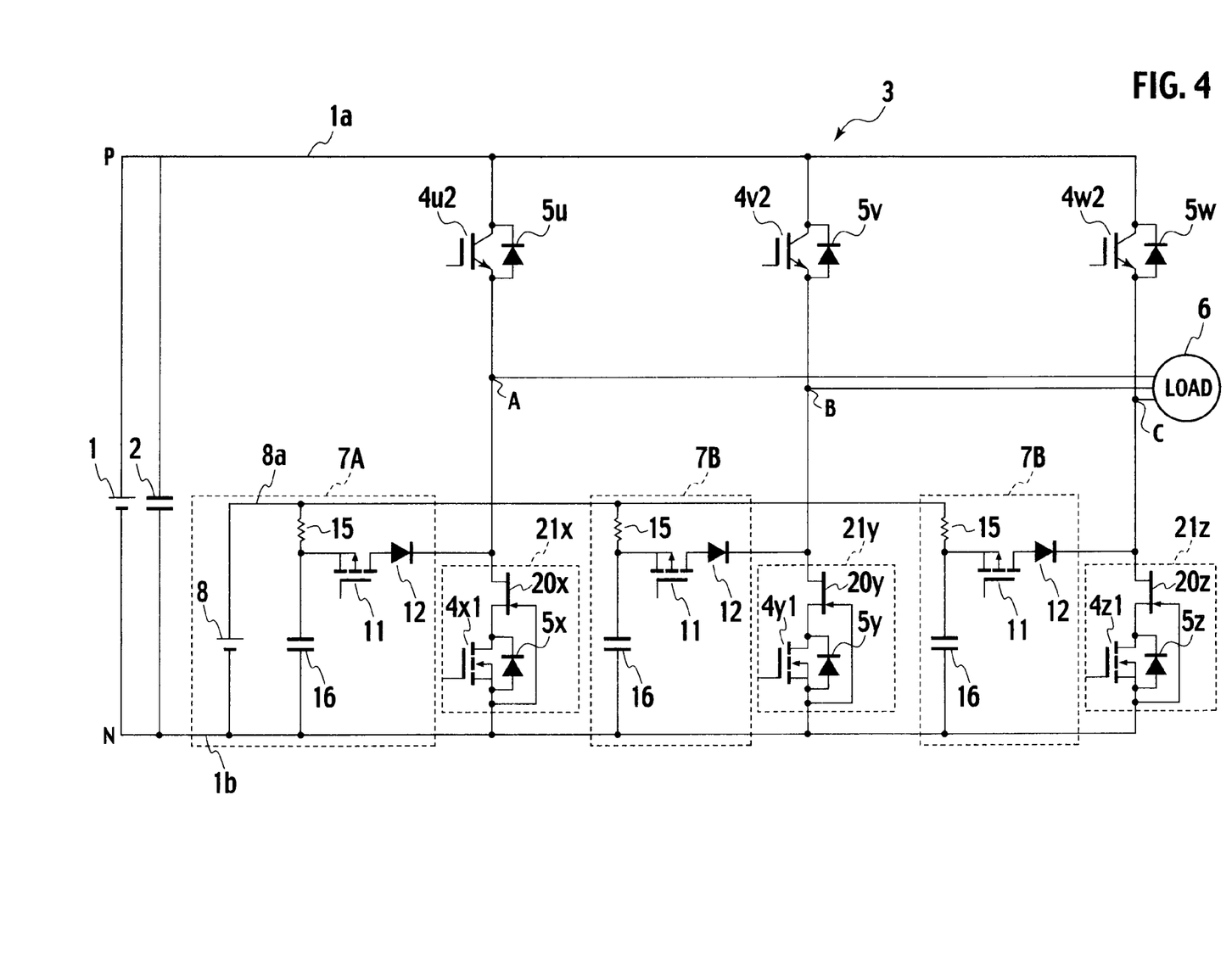
FIG. 4 is a circuit configuration diagram of an electric power conversion system according to a fourth embodiment of the present invention.

FIG. 4 is a circuit configuration diagram of an electric power conversion system according to the fourth embodiment of the present invention. As of parts of this embodiment, like parts to parts of the circuit configuration diagram of the electric power conversion system according to the third embodiment shown in FIG. 3 are designated by like reference characters, and description thereof is omitted. Further, in FIG. 4, for simplification, gate drive circuits 9 and gate drive circuits 13 in reverse voltage application circuits 7A and 7B are not depicted.

The present embodiment is different from the third embodiment in that an inverter main circuit 3 has main circuit switching devices 4u2, 4v2, and 4w2 as positive arm devices thereof substituting for the cascode devices 21u, 21v, and 21w, cutting out reverse voltage application circuits of these devices, and that it is configured such that reverse voltage application circuits 7B for cascode devices 21y and 21z of negative arms are supplied with low-voltage direct currents from a low-voltage direct current power supply 8 in a reverse voltage application circuit 7A for a cascode device 21x.

Here, for the main circuit switching devices 4u2, 4v2, and 4w2 for positive arms, there are employed IGBTs having no built-in free wheeling diodes, and such free wheeling diodes 5u, 5v, and 5w as having short reverse recovery times and small reverse recovery losses are connected in reverse parallel to the main circuit switching devices 4u2, 4v2, and 4w2. Such the application of a free wheeling diode with a small reverse recovery loss allows for a reduced loss in reverse recovery of the free wheeling diode, thus enabling a configuration having cut a reverse voltage application circuit.

On the other hand, to the negative end cascode devices 21x, 21y, and 21z, the reverse voltage application circuits 7A and 7B are connected. The reverse voltage application circuit 7A has the low-voltage direct current power supply 8 as a common to circuits of three phases being a phase x, phase y, and phase z. This is because of power supply lines of low-voltage direct current power supply for the phase x, phase y, and phase z that can be communized for one to a negative direct current bus 1b of a direct current power supply 1, and for the other to a power supply line 8a of the low-voltage direct current power supply 8.

According to the fourth embodiment, a reverse voltage application circuit is applied simply for the negative end cascode devices 21x, 21y, and 21z, without the need of providing low-voltage direct current power supplies 8 for three phases, one each phase, thus affording to simply have one common to the phases. It therefore is allowed to aim at simplification of reverse voltage application circuitry.

Fifth Embodiment

Figure 5:
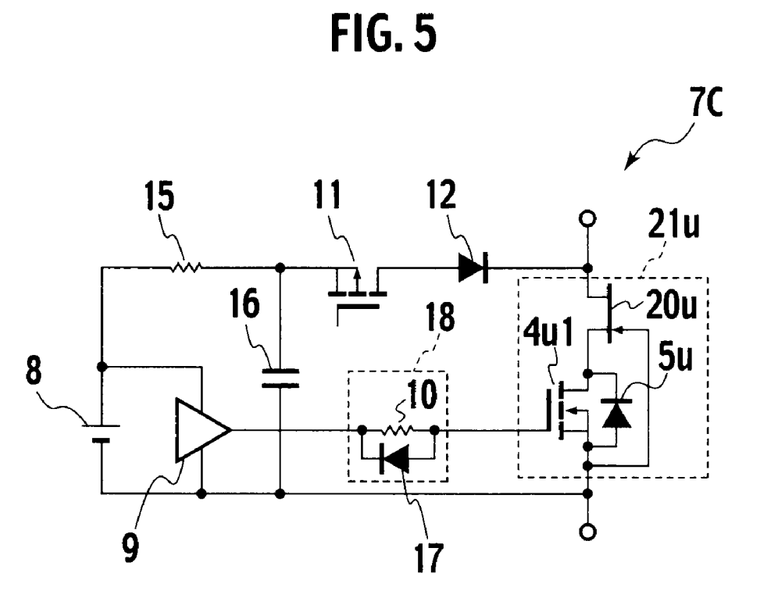
FIG. 5 is a circuit configuration diagram of a reverse voltage application circuit of a power transistor apparatus according to a fifth embodiment of the present invention.

FIG. 5 is a circuit configuration diagram of a reverse voltage application circuit 7C used in an electric power conversion system according to the fifth embodiment of the present invention. As of parts of this embodiment, like parts to parts of a circuit configuration diagram of the reverse voltage application circuit 7A used in the electric power conversion system according to the third embodiment shown in FIG. 3 are designated by like reference characters, and description thereof is omitted. Further, for simplification, a gate drive circuit 13 is not depicted in the figure.

The reverse voltage application circuit 7C in the present embodiment is different from the reverse voltage application circuit 7A in the third embodiment in that it is configured such that a voltage changing rate changing rate promoting diode 17 is connected in parallel with a gate resistor 10, and this parallel circuit is operated as a voltage changing rate changing rate promotion circuit 18.

When a cascode device 21 turns off, a gate drive circuit 9 is operated, whereby such a gate drive signal that would have been input to a gate terminal of a main circuit switching device 4u1 is kept from being output. Here is the voltage changing ratechanging rate promotion circuit 18 having the voltage changing ratechanging rate promoting diode 17, whereby, when it turns off, a gate drive signal is removed, not through the gate resistor 10, but through the voltage changing ratechanging rate promoting diode 17. That is, a gate drive signal is removed through the voltage changing ratechanging rate promoting diode 17 that has a lower impedance than the gate resistor 10, thus allowing for a faster turn-off than turning off through the gate resistor 10.

According to the fifth embodiment, the main circuit switching device 4u1 can be turned off at a high speed by the voltage changing ratechanging rate promotion circuit 18, allowing for a promoted voltage changing ratechanging rate between positive and negative electrodes of the cascode device 21u, with a faster turn-off of cascode device. It therefore is possible to reduce turn-off losses of cascode devices, allowing for provision of an electric power conversion system with a smaller scale and lower loss.

Sixth Embodiment

Figure 6:
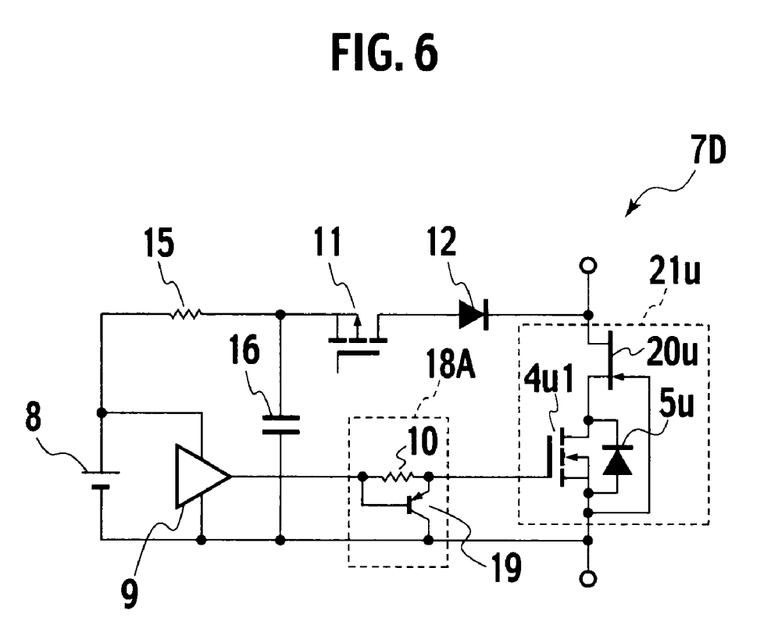
FIG. 6 is a circuit configuration diagram of a reverse voltage application circuit of a power transistor apparatus according to a sixth embodiment of the present invention.

FIG. 6 is a circuit configuration diagram of a reverse voltage application circuit 7D used in an electric power conversion system according to the sixth embodiment of the present invention. As of parts of the reverse voltage application circuit 7D in this embodiment, like parts to parts of the circuit configuration diagram of the reverse voltage application circuit 7C used in the electric power conversion system according to the fifth embodiment shown in FIG. 5 are designated by like reference characters, and description thereof is omitted. Further, for simplification, a gate drive circuit 13 is not depicted in the figure.

This embodiment is different from the fifth embodiment in that it is configured such that the parallel connection of voltage changing ratechanging rate promoting diode with a gate resistor 10 is substituted by provision of a voltage changing rate promoting transistor 19 between a gate and a negative electrode of a switching device 4u1, thereby constituting a voltage changing rate promotion circuit 18, and a gate of the voltage changing rate promoting transistor 19 is connected to a low-voltage power supply end terminal of the gate resistor 10.

By such configuration, the voltage changing rate promoting transistor 19 is turned off while the main circuit switching device 4u1 is supplied with a gate drive signal, but upon a removal of gate drive signal from a gate drive circuit 9 for a turn-off of the main circuit switching device 4u1, the voltage changing rate promoting transistor 19 turns on, enabling a fast turn-off of the main circuit switching device 4u1 by a route of low impedance that does not go through the gate resistor 10, thus allowing for a promoted voltage changing rate between positive and negative electrodes of a cascode device 21u. Therefore, like the case of the fifth embodiment, it is possible to reduce turn-off losses of cascode devices, allowing for provision of an electric power conversion system with a small scale and low loss.

Seventh Embodiment

Figure 7:
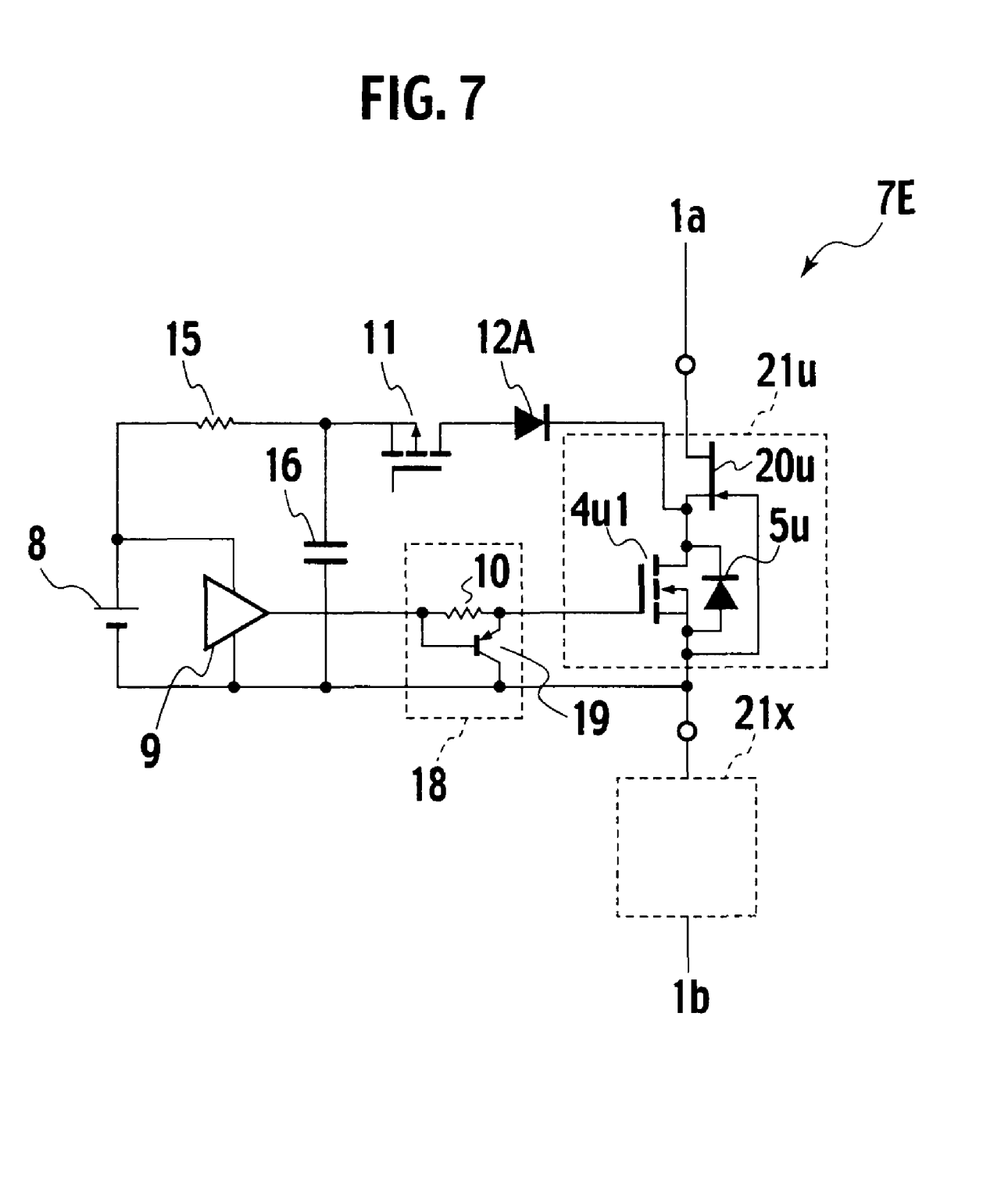
FIG. 7 is a circuit configuration diagram of a reverse voltage application circuit of a power transistor apparatus according to a fifth embodiment of the present invention.

FIG. 7 is a circuit configuration diagram of a reverse voltage application circuit 7E used in an electric power conversion system according to the seventh embodiment of the present invention. As of parts of this embodiment, like parts to parts of the circuit configuration diagram of the reverse voltage application circuit 7D used in the electric power conversion system according to the sixth embodiment shown in FIG. 6 are designated by like reference characters, and description thereof is omitted. Further, for simplification, a gate drive circuit 13 is not depicted in the figure.

This embodiment is different from the sixth embodiment in that it is configured such that an auxiliary diode 12A has a still lower withstand voltage, and a cathode of the auxiliary diode 12A is connected to a cathode of a free wheeling diode 5u.

The free wheeling diode 5u has a main circuit current conducted therethrough, which can be reverse recovered by a reverse voltage application circuit 7, as described with reference to the first embodiment shown in FIG. 1. In the seventh embodiment, a main circuit current flowing into the reverse voltage application circuit 7E passes through a power supply line 8b of a low-voltage direct current power supply 8, and inflows to the low-voltage direct current power supply 8 and a high-frequency capacitor 15. And, going through a reverse voltage application switching device 11, the auxiliary diode 12A, and a normally on switching device 20u, it flows to a positive direct current bus 1a end of a direct current voltage source 1.

Here, between a gate and a source terminal of the normally on switching device 20u, three is applied a voltage of the low-voltage direct current power supply 8. However, the normally on switching device 20u is kept from turning off with voltage of the low-voltage direct current power supply 8, and a main circuit current flowing into the reverse voltage application circuit 7E can flow through the positive direct current bus 1a to the direct current voltage source 1.

After that, at a phase x having a reverse polarity to the phase u, as a cascode device 21x turns on, such a main circuit current that would have been conducted through the reverse voltage application circuit 7E flows to the cascode device 21x. As a main circuit current is conducted through the cascode device 21x, a main circuit switching device 4u1 has a voltage imposed thereon, whereby a sufficient voltage to turn off the normally on switching device 20u is applied between the gate and the source terminal of the normally on switching device 20u, so the normally on switching device 20u is turned off. As the normally on switching device 20u is turned off, such a main circuit current that would have been conducted through the reverse voltage application circuit 7E is kept from flowing.

The auxiliary diode 12A has a reverse voltage imposed thereon with a substantially identical level to the main circuit switching device 4u1, so the auxiliary diode 12A is reverse recovered before a turn-off. Generally, between the reverse recovery loss to be caused upon a reverse recovery of diode and the withstand voltage of device, there is a trade-off relationship, and by selection of a low withstand voltage of auxiliary diode 12A, the reverse recovery time can also be shortened, allowing the auxiliary diode 12A to have a reduced reverse recovery loss. Further, also for the conduction loss to be caused upon a current conduction of diode, there is a trade-off relationship to the withstand voltage of device, and by selection of a low withstand voltage of auxiliary diode 12A, the conduction loss of auxiliary diode 12A can also be reduced.

As described above, according to the seventh embodiment, in the reverse voltage application circuit 7E, the auxiliary diode 12A is given a lower setting by selection than withstand voltage of the main circuit switching device 4u1, thereby enabling reduction of the reverse recovery loss and conduction loss, allowing for provision of an electric power conversion system with a still smaller scale and lower loss.

In the first to the seventh embodiment having been described, as the auxiliary diodes 12 and 12A, auxiliary diodes composed of a wide gap semiconductor may be applied, allowing for a yet reduced loss. For the wide gap semiconductor, SiC (silicon carbide), GaN (gallium nitride), and a diamond are applicable.

Auxiliary diodes composed of a wide gap semiconductor can have a dielectric breakdown field strength increased about single digit in comparison with silicon semiconductors, allowing an increased withstand voltage of auxiliary diode to be implemented. For example, even for auxiliary diodes to have such a high withstand voltage that in use of silicon semiconductors no application to auxiliary diode is possible except as a bipolar diode, in use of a wide gap semiconductor the application of unipolar diode is practicable. Use of a unioplar diode can be free from storage of minor carriers and formation of reverse recovery charges, and no reverse recovery currents flow, with an essentially zero reverse recovery loss. Although the unipolar diode has charges stored in a junction capacity, charge and discharge currents of the junction capacity are little. Thus, the loss of auxiliary diode can be reduced. Further, no revere recovery currents inflow to a reverse voltage application circuit and a main circuit switching device, and the loss by revere recovery current can be reduced. Such being the case, the application of a wide gap semiconductor to auxiliary diodes permits losses by revere recovery currents to be reduced, thus allowing for provision of an electric power conversion system with a yet smaller scale and lower loss.

Further, in the first to the seventh embodiment having been described, as the main circuit switching devices and the normally on switching devices, switching devices composed of a wide gap semiconductor may be applied, allowing for a yet reduced loss. For the wide gap semiconductor, SiC (silicon carbide), GaN (gallium nitride), and a diamond are applicable.

Switching devices made up by use of a wide gap semiconductor can have, in comparison with silicon semiconductors, a dielectric breakdown field strength increased about single digit, and a dielectric breakdown withstand voltage held by a drift layer narrowed to a $1/10$ or near, allowing for a reduced conduction loss of switching device. Further, they can have, in comparison with silicon semiconductors, a saturated electron drift speed increased about twice, thus allowing for implementation of a high frequency about ten times increased. This permits turn-on and turn-off losses of switching device to be reduced. Such being the case, the application of a wide gap semiconductor to main circuit switching devices and normally on switching devices permits conduction losses as well as turn-on and turn-off losses of switching devices to be reduced, thus allowing for provision of an electric power conversion system with a yet smaller scale and lower loss.

The invention claimed is:

1. An electric power conversion system comprising:
    a direct current power supply;
    a plurality of main circuit switching devices bridge-connected to convert direct current of the direct current power supply to alternating current, each respectively including a free wheeling diode connected in reverse parallel thereto; and
    a reverse voltage applying means for applying a reverse voltage smaller than a voltage of the direct current power supply to the free wheeling diode, upon a cutoff of back-flow current of the free wheeling diode,
    the reverse voltage applying means comprising a series connection of a low-voltage direct current power supply having a lower voltage than the direct current power supply, a reverse voltage application switching device having a lower withstand voltage than the main circuit switching device and adapted to turn on upon a reverse recovery of the free wheeling diode, and an auxiliary diode having a shorter reverse recovery time than the free wheeling diode,
    the reverse voltage application switching device being a device having holes as a majority carrier.

2. The electric power conversion system as claimed in claim 1, further comprising:
    a current suppressing resistor connected in series to the low-voltage direct current power supply; and
    a high-frequency capacitor connected in parallel to a series circuit of the low-voltage direct current power supply and the current suppressing resistor.

3. The electric power conversion system as claimed in claim 1, wherein the main circuit switching device is driven by an output of the low-voltage direct current power supply.

4. The electric power conversion system as claimed in claim 1, further comprising a voltage changing rate promoting means for reducing a gate drive impedance of the main circuit switching device, when the main circuit switching device is off, to promote a temporal change of an output voltage of the main circuit switching device.

5. The electric power conversion system as claimed in claim 1, wherein the auxiliary diode comprises a wide gap semiconductor.

6. The electric power conversion system as claimed in claim 1, wherein the main circuit switching device comprises a wide gap semiconductor.

7. The electric power conversion system as claimed in claim 2, wherein the main circuit switching device is driven by an output of the low-voltage direct current power supply.

8. The electric power conversion system as claimed in claim 2, further comprising a voltage changing rate promoting means for reducing a gate drive impedance of the main circuit switching device, when the main circuit switching device is off, to promote a temporal change of an output voltage of the main circuit switching device.

9. The electric power conversion system as claimed in claim 2, wherein the auxiliary diode comprises a wide gap semiconductor.

10. The electric power conversion system as claimed in claim 2, wherein the main circuit switching device comprises a wide gap semiconductor.

11. The electric power conversion system as claimed in claim 1, wherein the main circuit switching device includes a normally on switching device connected in series thereto, and a gate of the normally on switching device is connected with a negative electrode of the main circuit switching device to have the normally on switching device turning on and off in synchronism with the main circuit switching device turning on and off.

12. An electric power conversion system comprising:
    a direct current power supply;
    a plurality of main circuit switching devices bridge-connected to convert direct current of the direct current power supply to alternating current, each respectively including a free wheeling diode connected in reverse parallel thereto;
    a plurality of normally on switching devices each respectively connected in series to, among the main circuit switching devices, a main circuit switching device in a negative arm, and connected, for turn-ons and turn-offs in synchronism with turn-ons and turn-offs of the main circuit switching device in the negative arm, at a gate thereof with a negative electrode of the main circuit switching device; and
    a reverse voltage applying means for applying, upon a cutoff of back-flow current of a reverse voltage smaller than a voltage of the direct current power supply to each free wheeling diode in the negative arm among the free wheeling diodes,
    the reverse voltage applying means comprising a series connection of a low-voltage direct current power supply having a lower voltage than the direct current power supply, a reverse voltage application switching device having a lower withstand voltage than the main circuit switching device and adapted to turn on upon a reverse recovery of the free wheeling diode, and an auxiliary diode having a shorter reverse recovery time than the free wheeling diode, the reverse voltage application switching device being a device having holes as a majority carrier.

13. The electric power conversion system as claimed in claim 12, further comprising:

a current suppressing resistor connected in series to the low-voltage direct current power supply; and a high-frequency capacitor connected in parallel to a series circuit of the low-voltage direct current power supply and the current suppressing resistor.

14. The electric power conversion system as claimed in claim 12, wherein the main circuit switching device is driven by an output of the low-voltage direct current power supply.

15. The electric power conversion system as claimed in claim 12, further comprising a voltage changing rate promoting means for reducing a gate drive impedance of the main circuit switching device, when the main circuit switching device is off, to promote a temporal change of an output voltage of the main circuit switching device.

16. The electric power conversion system as claimed in claim 12, wherein the auxiliary diode includes a withstand voltage thereof lower than a withstand voltage of the normally on switching device, and the reverse voltage applying means is connected in parallel to the main circuit switching device.

17. The electric power conversion system as claimed in claim 12, wherein the auxiliary diode comprises a wide gap semiconductor.

18. The electric power conversion system as claimed in claim 12, wherein the main circuit switching device comprises a wide gap semiconductor.

19. The electric power conversion system as claimed in claim 12, wherein the normally on switching device comprises a wide gap semiconductor.

20. The electric power conversion system as claimed in claim 13, wherein the main circuit switching device is driven by an output of the low-voltage direct current power supply.

21. The electric power conversion system as claimed in claim 13, further comprising a voltage changing rate promoting means for reducing a gate drive impedance of the main circuit switching device, when the main circuit switching device is off, to promote a temporal change of an output voltage of the main circuit switching device.

22. The electric power conversion system as claimed in claim 13, wherein the auxiliary diode includes a withstand voltage thereof lower than a withstand voltage of the normally on switching device, and the reverse voltage applying means is connected in parallel to the main circuit switching device.

23. The electric power conversion system as claimed in claim 13, wherein the auxiliary diode comprises a wide gap semiconductor.

24. The electric power conversion system as claimed in claim 13, wherein the main circuit switching device comprises a wide gap semiconductor.

25. The electric power conversion system as claimed in claim 13, wherein the normally on switching device comprises a wide gap semiconductor.

* * * * *